United States Patent [19]

Losada

[11] 4,439,079
[45] Mar. 27, 1984

[54] WALL ANCHOR ASSEMBLY

[76] Inventor: Al Losada, 30 Stag St., Stratford, Conn. 06497

[21] Appl. No.: 286,581

[22] Filed: Jul. 24, 1981

[51] Int. Cl.³ .................... F16B 21/00; F16B 13/06
[52] U.S. Cl. ................................ 411/345; 411/340; 24/16 PB
[58] Field of Search ................................ 411/34–38, 411/340, 342, 344, 345, 907, 908; 24/16 PB, 208 A, 211 P, 211 R, 272

[56] References Cited

U.S. PATENT DOCUMENTS

| | | | |
|---|---|---|---|
| 3,731,347 | 5/1973 | Caveney et al. | 24/16 PB |
| 3,860,997 | 1/1975 | Van Riper, Jr. et al. | 24/16 PB |
| 4,043,245 | 8/1977 | Kaplan | 411/346 |
| 4,075,924 | 2/1978 | McSherry et al. | 411/366 |
| 4,294,156 | 10/1981 | McSherry et al. | 411/345 |

*Primary Examiner*—Gary L. Smith
*Assistant Examiner*—Neill Wilson
*Attorney, Agent, or Firm*—Arthur T. Fattibene

[57] ABSTRACT

An anchor assembly for use on a wall to support a fixture or load thereon which includes an elongated anchor plate sized to be received in a hole formed in a wall and which in the operative position abutts the blind side of the wall. A pair of flexible leg members are hingedly connected to the anchor plate in a manner to control the positioning of the anchor plate on the blind side of the wall, and having a slip collar slidably mounted on the leg members whereby the collar is ratcheted along the leg member in a unidirectional manner to firmly secure the anchor plate to the blind side of the wall and whereby the collar can be readily released to render it freely slidable along the leg members to facilitate assembly and removal of the anchor assembly.

In one embodiment the respective leg members are hingedly connected to the anchor plate by a hinge strap connected to the anchor plate, and the respective leg members having an integrally formed hinge pin which is retained in the hinge strap whereby the anchor plate can be pivoted between a normal position or parallel position relative to the respective leg members.

9 Claims, 13 Drawing Figures

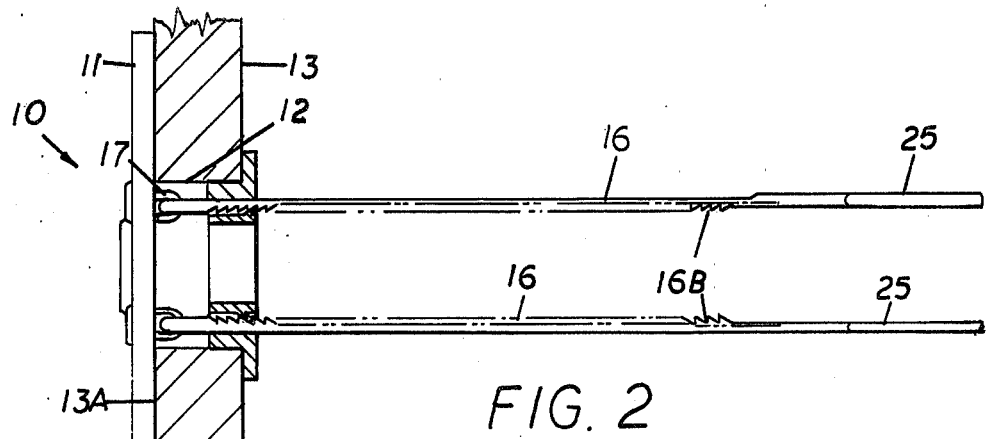
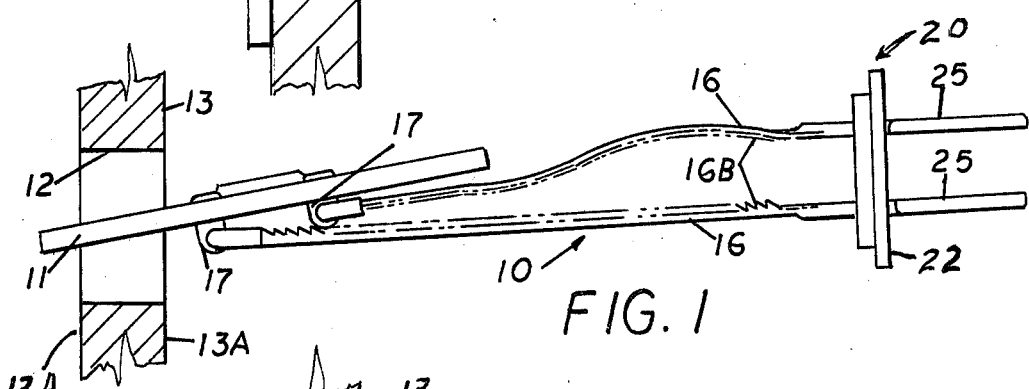
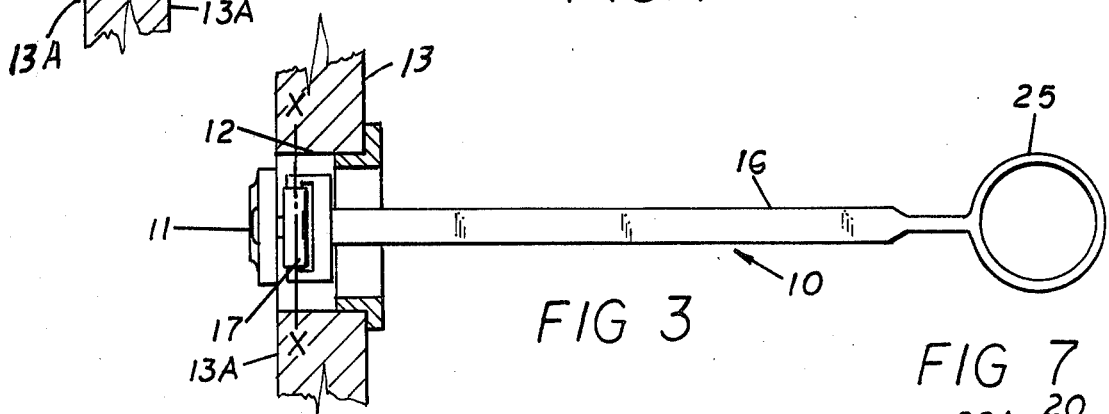
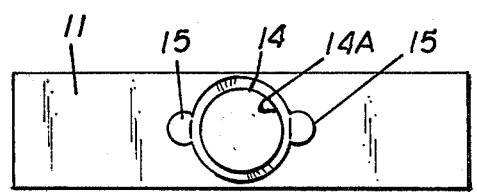
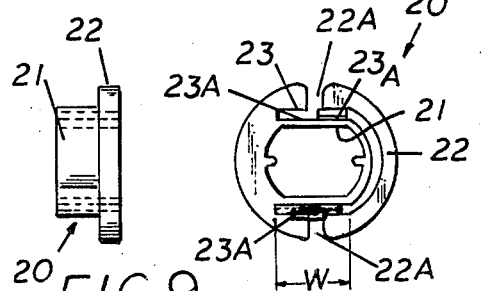
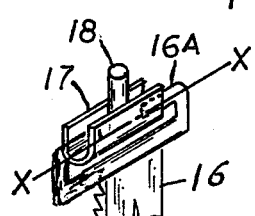
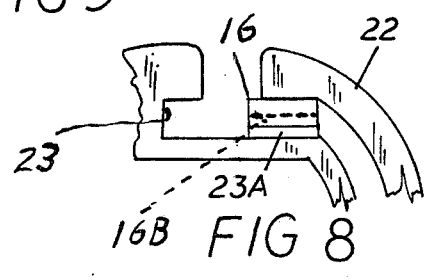

WALL ANCHOR ASSEMBLY

PRIOR ART

The art of anchoring devices for supporting a load on a hollow or relatively thin wall structure is known to be highly developed, and various known efforts have been made to improve the manner by which a load or fixture can be secured to a wall, not otherwise suitable for supporting such load or fixture. Particular reference is made to the anchor devices of the type disclosed in U.S. Pat. Nos. 4,043,245 and 4,075,924. The construction discloed by these patents generally includes a channel shaped anchor to which a pair of flexible leg members are connected either by a flexible extension or by pivot pins, and a collar which can not be readily released when the anchoring channel is secured in place. While these patented constructions can be satisfactorily utilized, they each have some noted disadvantage in that the anchor channel cannot be readily removed once it is secured to the wall. Also, the manner in which the leg members are pivotably connected to the anchor channel, as disclosed in U.S. Pat. No. 4,043,245, does not permit a user to control the positioning of the anchor on the blind side of the wall. The construction and manner of assembly of these prior art devices have certain other inherent characteristics which may be objectable; e.g. an enlarged or oversize hole is required to be made in the wall to accept the channel shaped anchor.

In addition to the foregoing noted prior art constructions, there are a host of other types of anchoring devices, all seeking to produce the end result of supporting a load on a wall. Such known efforts are disclosed in the following U.S. Pat. Nos. 450,127; 991,426; 991,427; 1,003,527; 1,353,159; 1,374,924; 1,493,197; 1,600,034; 1,845,283; 2,061,478; 2,404,169; 2,578,515; 3,175,452; 3,362,919; 3,127,808; 3,241,420; 3,244,056; 3,288,014; 3,453,925; 3,513,746; 3,707,898; 3,921,334; 4,047,462; 4,116,104 and 4,120,231.

OBJECTS

An object of this invention is to provide an improved wall anchoring device which is relatively simple in construction and which can be readily manufactured and assembled with a minimum of cost.

Another object is to provide an improved wall anchoring device which can be readily assembled and disassembled relative to a supporting wall.

Another object is to provide an improved wall anchor having an enhanced loading capacity.

Another object is to provide an improved wall anchoring device which can be inserted into a smaller hole than that required for a compable anchor device.

Another object is to provide an anchor device capable of supporting greater loads on a wall over that a compable size device.

Another object is to provide an anchor device having maximum bearing surfaces.

BRIEF SUMMARY OF THE INVENTION

The foregoing objects and other features and advantages are obtained by a wall anchoring device which comprises a wall anchor in the form of a flat plate having an opening therein for receiving a fastening device by which a fixture or load is secured to a wall. The plate is sized to pass through a hole formed in a wall. Hingedly connected to the plate are a pair of leg members about which the anchor plate is free to pivot between a position perpendicular to the leg members and a position generally parallel thereto. In one embodiment the hinge connection is effected by a pair of hinge straps which are secured to the plate so as to be disposed to opposite sides of the opening formed in the plate and having the hinge axis extending transversely of the plate. The connected end of the respective leg members is provided with an integrally formed hinge pin which is cradled in the complementary hinge strap so that the anchor plate can pivot relative to the leg members.

In accordance with this invention, a slip collar is slidably mounted on the respective leg members. The leg members and collar are each provided with complementary ratcheting teeth so that the collar is moved along the respective leg members in one direction in an unidirectional manner to secure the anchor plate in position on the blind side of the wall. The slideway of the slip collar for receiving the leg members has an extended portion whereby the collar can be shifted relative to the complementary leg members to effect a disengagement of the ratcheting teeth so that the collar can be readily moved in an opposite direction to release the anchoring device from the wall.

FEATURES

A feature of this invention resides in an improved hinging connection by which the leg members are pivotably connected to the anchor plate to facilitate the manufacture and/or assembly thereof.

Another feature resides in the provision of a collar constructed so as to be ratcheted along the leg members in an unidirectional manner to secure the anchor device to a wall and which collar can be slipped in the opposite direction independently of the ratcheting effect.

Another feature resides in an anchoring device having an anchor plate constructed to retain the anchoring device on the blind side of the wall.

Other features and advantages will become more readily apparent when considered in view of the drawings and specification in which:

FIG. 1 is a side elevation view of the wall anchor assembly embodying the invention illustrated in a position to facilitate passage through a wall opening.

FIG. 2 illustrates a side view of the wall anchor assembly in position on a wall.

FIG. 3 is a top plan view of FIG. 2.

FIG. 4 is a detail plan view of the anchor plate.

FIG. 5 is a sectional detail view of the hinge straps.

FIG. 6 is a perspective detail view of the hinge assembly.

FIG. 7 is a detail front view of the slip collar.

FIG. 8 is an enlarged fragmentary detail view of the slip collar.

FIG. 9 is an end view of the slip collar.

DETAIL SPECIFICATION

Figures 10, 11:
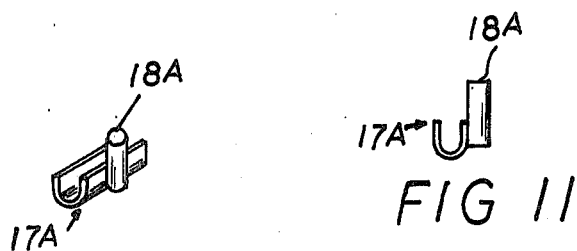
FIG. 10 is a perspective view of a modified hinge strap construction.
FIG. 11 is an end view of the strap construction of FIG. 10.

Referring to the drawings there is shown an anchoring device 10 embodying the present invention. As shown in FIGS. 1 to 9 the anchoring device 10 includes an anchor plate 11, which is illustrated as an elongated flat plate which is sized so as to project through an opening 12 formed in a wall 13. The anchor plate 11 is provided with a central opening 14 for receiving the fastener or screw (not shown) for afixing or supporting a fixture or load on the wall 13. In the illustrated embodiment the opening 14 may be punched or formed so that the material displaced forms a raised portion which is then tapped or formed with internal threads 14A for receiving or mating with the threads of a fastener. Disposed to either side of the opening 14 and extending along a longitudinal axis of the plate are holes 15-15.

A pair of elongated leg members 16-16 are hingedly connected to the anchor plate 11. The leg members 16-16 may be similarly constructed. The hinge means for connecting the legs members 16-16 to the anchor plate 11 includes a hinge strap 17 which is preferably formed or made of a suitable plastic or metal material. The respective hinge straps 17 are generally U-shaped to define a hinge axis X-X that extends transversely of the anchor plate. Connected intermediate the open end of the strap 17, as best seen in FIGS. 5 & 6, is a projecting pin 18, which is received in hole 15 in the plate 11. To positively secure the hinge strap 17 to plate 11, the end of the pin 18 is snap fitted or expanded or rolled much like a rivet. Also the holes 15 in forming the plate 11, as hole 14 is formed become flattened along the periphery adjacent to the opening 14. The inherent flattening of one side hole 15 in forming the plate 11 thus functions to prohibit rotation of the hinge 17 relative to the plate 11.

The leg member 16 is formed at one end thereof with an integrally formed hinge pin 16A. As shown in FIG. 6, the hinged end of the leg member 16 is formed with a C-shaped configuration having inwardly turned end portion to define spaced apart hinge pins. With the hinged end of the leg member 16 so formed, it will be apparent that the inturned ends 16A-16A can be readily fitted or assembled to the hinge strap 17 as seen in FIG. 6.

In the final assembly the leg member 16 and connected hinge strap 17 is secured to the plate 11 by inserting the strap pin 18 into its appropriate hole 15, and the end of the pin 18 rolled or expanded to secure the hinge strap to the plate 11, are herein described. In the assembled position, as seen in FIGS. 1 to 3, the inturned hinge pins 16A are positively retained between the plate 11 and the straps, and yet are sufficiently free to permit the plate 11 to pivot relative to the leg members 16-16. Thus as seen in FIGS. 1 and 2 the anchor plate 11 is free to pivot between a position normal to the respective leg members 16-16 wherein the leg members are spaced apart (FIG. 2) and a position generally parallel to the leg members when the leg members are brought into a contiguous overlying position as seen in FIG. 1. With this construction the anchor assembly 10 can be readily collapsed simply by bringing the leg members 16-16 into an overlying contiguous position wherein the distance of one leg is foreshortened causing the one leg to flex as shown in FIG. 1. In the collapsed position as shown in FIG. 1, the anchor plate 11 and connected leg members can be readily inserted through the hole 12 formed in the wall. With the anchor plate disposed within the wall, the anchor plate 11 can be readily shifted to its normal position merely by equalizing the leg members 16-16 as shown in FIG. 2. In so doing the anchor plate 11 is automatically shifted to its normal position. (FIG. 2).

To secure the anchor plate 11 on the blind side 13A of the wall, a slip collar 20 is provided. As shown the slip collar 20 is provided with a central opening 21 and a circumscribing flange 22. As shown in FIGS. 7 & 8, the flange 22 is provided with opposed slots 22A-22A which communicate with a slideway 23 formed on opposite sides of the collar. The arrangement is such that the leg members 16-16 are receivable within its respective slideway 23-23.

In accordance with this invention the elongated portion of the leg members is provided with a series of ratchet like teeth 16B. The slideway 23 in the collar is provided with a complementary tooth 23A which is adapted to ratchet with the ratchet teeth 16B so as to allow the collar to slide relative to the leg members in a unidirectional manner. Thus, with the tooth 23A of the collar ratcheting over the ratchet teeth 16B of the leg member 16, the collar 20 is free to slide towards the anchor plate 11 and can not slide in the opposite direction. Therefore the anchor plate 11 can be readily secured in place to the blind side 13A of the wall 13 by drawing the anchor plate 11 to the wall by advancing the collar 20 towards it whereby the wall is wedged between the anchor plate 11 and the collar 20. In the assembled position the collar 20 extends into the wall opening 12 with the flange portion 22 abutting the wall. With the collar so secured in the assembled position, the leg member 16 being formed of a suitable plastic or metal can be readily snapped or broken at the face of the flange 22 to provide a flush mount for receiving the load or fixture to be supported on the wall by a screw fastener threaded into the tapped opening 14 of the plate 11.

In the event it becomes necessary to remove the anchor device from the wall or to free the anchor device for any reason after the collar 20 has been advanced along the leg members 16-16, a means is provided to free the ratcheting tooth 23A from the ratchet tooth 16B so that the anchor plate can be readily withdrawn from the wall opening 12. This is accomplished by forming the slideway 23 with a width W which is greater than the width of the respective leg members, and by forming the ratchet tooth 23A with a width which is less than that of the slideway. Thus the ratchet tooth 23A can be readily disengaged from the ratchet teeth 16B by effecting a slight displacement of the collar 20 relative to the leg members 16-16. The latteral displacement provided is the amount sufficient to move the ratchet teeth 16B out of engagement with the ratchet tooth 23A. With the ratchet tooth 23A disposed to one side of the ratchet teeth 16B, the collar 20 is thus free to slide along the respective leg members in either direction. The slideway construction 23 as herein defined thus enables the anchor device 10 to be positively locked or ratcheted to secure the anchor plate in place, or can be readily released from its secured position without destroying the anchor assembly, if for any reason a change or removal thereof is required.

With the construction herein described an anchoring device 10 is provided which can be inserted into a wall opening or hole 12 of a minimum diameter. For example, an anchoring device having a channel shape anchor which is sized to accept a ⅜" fastener would require a ¾" hole to be drilled into a wall. With the construction of fastener herein described an anchor plate for a ⅜" fastener could be readily passed through a ⅜" wide hole in a wall. This is because with the construction herein described the wall opening need not be sized to accommodate the flange of a channel shaped anchor which would require a larger size hole to accommodate the channel flange.

FIGS. 10 and 11 illustrate a modified hinge strap 17A. In this form the hinge strap 17A includes a generally U-shaped member similar to that hereinbefore described. However in this form, the strap pin 18A is disposed to the outside edge of the hinge strap 17A, as best seen in FIGS. 10 and 11. In all other respects the anchor assembly is similar to that hereindescribed with respect to FIGS. 1 to 9.

Figure 12:
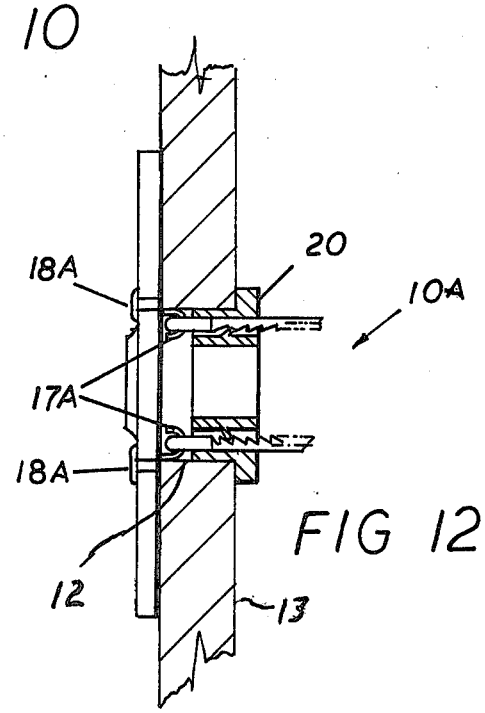
FIG. 12 is a side view of an anchor assembly utilizing the hinge straps of FIGS. 10 and 11.

FIG. 12 illustrates an anchor assembly 10A embodying the hinge strap construction 17A of FIGS. 10 and 11. By disposing the hinge strap 17A to the inside of the connected strap pin 18A, as best seen in FIG. 12, the size of the hole 12 in the wall 13 can be held to a minimum diameter. This is because the diameter of the strap pins 18 need not be provided for in forming the wall opening 12. Thus the size of the wall opening 12 can be further reduced. The present structure thus provides for maximum load bearing anchor device with minimum size openings or holes 12 being required to be formed in a wall, thus enhancing the load bearing capacity of the wall and of the anchoring device.

Figure 13:
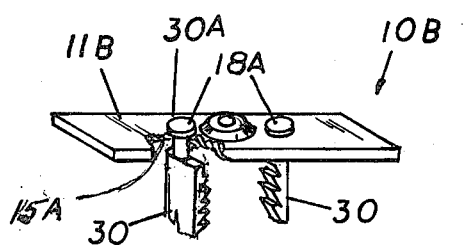
FIG. 13 is a modified embodiment of an anchor assembly.

FIG. 13 illustrates another modified embodiment of the invention. In this form the anchor assembly 10B includes an anchor plate 11B similar to that herein described. In this embodiment however, the respective ends of the leg members 30-30 are each provided in a longitudinally extending pin portion 30A-30A which is inserted directly into the pin holes 15A-15A formed in the anchor plate 11B. Thus in this form the leg members 30-30 are directly connected to the hinge plate. As the leg members 30-30 are formed of a flexible plastic or metal material they can be readily flexed, as herein described with respect to FIGS. 1 and 2, to position the anchor plate 11B between a normal operative position, as in FIG. 2 or in the insertion position of FIG. 1. It will be understood that the embodiment of FIG. 13 includes a slip collar 20 similar to that described with respect to FIGS. 1 to 9. In all other respects the construction and operation of the anchor assembly 10B is similar to that hereinbefore described.

To facilate the manipulation of the respective leg members, each may be formed with a gripping loop or means 25 formed on the free end thereof.

From the foregoing it will be noted that the described anchoring device is constructed so as to result in the need of wall openings having a minimum diameter, thereby making it easier and more expedient to make such holes or openings. Also a maximum load can be supported on by the described anchor device which requires a minimum wall opening size. The anchor plate also provides for maximum load bearing surface for supporting a load.

While the invention has been defined with respect to several embodiments, it will be readily understood and appreciated that variations and modifications can be made without departing from the spirit or scope of the invention.

What is claimed is:

1. An anchoring device for use in a wall to support a fixture thereon comprising:
an elongated anchor means sized to fit through an opening formed in a wall,
said anchor means having an opening formed therein adapted to receive a fastener,
a pair of elongated leg members hingedly connected to said anchor means, said leg members being disposed to either side of said opening,
ratchet teeth longitudinally spaced along the length of at least one of said leg members,
a releasable slip collar arranged to be slidably mounted along said leg members,
said collar having a central opening adapted to be disposed in alignment with the opening in said anchoring means,
said collar having opposed slideways for receiving said leg members, and
said slideways each having opposed closed ends confined within the periphery of said collar, the distance between said closed ends defining the width of said slideways, and said slideways having a width which is greater that the width of said leg members,
said collar being arranged to slide along said leg members,
a complimentary tooth formed in at least one of said slideways adapted to ratchet over the ratchet teeth of the corresponding leg member whereby said collar is free to ratcher over said ratchet teeth in one direction only, and whereby the width of said slideway relative to its corresponding leg member permits said collar and leg members to be shifted relative to one another so as to affect disengagement of the complimentary tooth of the slideway from the associated ratchet teeth of the corresponding leg member so that said collar is rendered freely slidable along said leg members independently of any ratcheting.

2. An anchoring device as defined in claim 1 wherein said
anchor means comprises an elongated plate,
a hinge means connected to said plate to either side of said opening,
the axis of said hinge means extending transversely of said anchor plate,
said leg members being hingedly connected to said hinge means whereby said anchor plate is rendered freely pivotable between a position normal to said leg members and a position parallel to said leg members.

3. An anchoring device for use in a wall to support a fixture thereon comprising:
an elongated anchor means sized to fit through an opening formed in a wall,
said anchor means having an opening formed therein adapted to receive a fastener,
a pair of elongated leg members hingedly connected to said anchor means, said leg members being disposed to either side of said opening,
ratchet teeth longitudinally spaced along the length of at least one of said leg members,
a releasable slip collar arranged to be slidably mounted along said leg members,
said collar having a central opening adapted to be disposed in alignment with the opening in said anchoring means,
said collar having opposed slideways for receiving said leg members, said collar being arranged to slide along said leg members,
a complimentary tooth formed in said slideway and adapted to ratchet along the ratchet teeth of the corresponding leg member whereby said collar is free to slide in one direction only, and said collar having means whereby the complimentary teeth of said slideway can be readily disengaged from the ratchet teeth of the corresponding leg member so that the collar is rendered freely slidable along said leg member in either direction without ratcheting, wherein said anchor means comprises an elongated plate, a hinge means connected to said plate to either side of said opening.

the axis of said hinge means extending transversely of said anchor plate, said leg members being hingedly connected to said hinge means whereby said anchor plate is rendered freely pivotable between a position normal to said leg members and a position parallel to said leg members, wherein said hinge means includes a generally U-shaped strap, a pin projecting beyond said strap between the open ends thereof, and said anchor means includes a hole disposed to either side of said opening, said pin being extended into said hole for securing the hinge strap to said anchor means, and said leg members each having a hinge pin connected to one end thereof arranged to be received in said hinge strap for hingedly connecting said leg members to its respective hinge strap.

4. An anchoring device as defined in claim 3 wherein said hinge pin is interrupted intermediate to the ends thereof.

5. An anchoring device for use on a wall to support a fixture thereon comprising an elongated co-planar flat anchor plate free of any depending flanges having a longitudinal axis and sized to fit a minimum sized opening formed in a wall sized to merely accommodate the width of said anchor plate only, said anchor plate having an opening formed therein and adapted to receive a fastener, means defining a hinge connected to said anchor plate, said hinge means being disposed to either side of said anchor plate opening, each of said hinge means having a hinge axis extending transversely of the longitudinal axis of said anchor plate, an elongated leg member hingedly connected to each of said hinge means to pivot about said respective transverse hinge axis, said leg members being disposed normally generally parallel to one another, and having a plurality of ratchet teeth disposed along a portion of the length thereof, and a slip collar having opposed slotted openings having opposed closed ends confined within the periphery of the collar for receiving said leg members, a complimentary tooth means formed in said slideway for engaging said ratchet teeth of the corresponding leg member to snugly retain said anchor plate against the blind side of a wall, and means for releasably disengaging said complimentary tooth means of said slideway from the ratchet teeth of said corresponding leg member by relative shifting between said leg members and collar when said collar is snugly retained in place on said wall for facilitating the removal of said anchor device from the wall.

6. An anchoring device as defined in claim 5 wherein said means for releasably engaging said collar from said leg members include a slotted opening having a width greater than the width of said corresponding leg member, and said complementary tooth has a width which is less than the width of said slotted opening whereby said collar can be displaced relative to said leg members to disengage said tooth from said ratchet teeth so that the collar is free to slide along the length of said leg members without ratchetting.

7. An anchoring assembly for use in a wall to support a fixture thereon comprising an elongated flat anchor plate sized to fit through a minimum sized opening formed in a wall and having a diameter sized to accommodate the width of said anchor plate only, a tapped hole formed in said anchor plate, a pair of flexible leg members, means for hingedly connecting said leg members to said plate to either side of said tapped hole whereby said anchor plate can be shifted between a normal position and a generally parallel position relative to said leg members, and a slip collar slidably mounted on said leg members, wherein said connecting means includes a hinge strap having a connecting strap pin, and defining a hinge axis extending transversely of said anchor plate, said anchor plate having a pin hole disposed to either side of said tapped hole, and said strap pin being inserted into the respective pin hole for securing said hinge strap to said anchor plate, and each of said leg members having a transversely extending hinge pin pivotably mounted in said hinge strap.

8. An anchor assembly as defined in claim 7 wherein said hinge strap comprises a generally U-shaped member having opposed side portions, said strap pin being disposed between said opposed side portions.

9. An anchor assembly as defined in claim 7 wherein said hinge strap comprises a generally U-shaped member having opposed side portions, said strap pin being connected to the outer side of said opposed side portion, and said strap pin being disposed into the respective pin hole formed in said anchor plate whereby said strap pin is disposed to the outher side of the adjacent side portion of said hinge strap.

* * * * *